(12) United States Patent
Kelley (10) Patent No.: US 8,839,095 B2
(45) Date of Patent: Sep. 16, 2014

(54) USER INTERFACE TO DEFINE AND/OR COMMUNICATE SPACE BETWEEN OBJECTS

(75) Inventor: Yohko A. Kelley, Woodinville, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1382 days.

(21) Appl. No.: 11/207,586

(22) Filed: Aug. 19, 2005

(65) Prior Publication Data

US 2013/0125033 A1    May 16, 2013

(51) Int. Cl.
*G06F 17/00* (2006.01)
*G06F 3/048* (2013.01)
*G06F 17/21* (2006.01)

(52) U.S. Cl.
CPC .............. *G06F 3/048* (2013.01); *G06F 17/211* (2013.01)
USPC ............ 715/244; 715/243; 715/245; 715/247

(58) Field of Classification Search
CPC ...... G06F 17/211; G06F 17/212; G06F 3/048
USPC ......... 715/201–205, 716, 723–726, 838–839, 715/243–247, 272
See application file for complete search history.

(56) References Cited

U.S. PATENT DOCUMENTS

| | | | | |
|---|---|---|---|---|
| 5,261,041 A | * | 11/1993 | Susman | 345/473 |
| 5,956,032 A | * | 9/1999 | Argiolas | 715/798 |
| 6,219,032 B1 | * | 4/2001 | Rosenberg et al. | 345/157 |
| 6,366,285 B1 | * | 4/2002 | Brush et al. | 345/473 |
| 6,415,306 B2 | * | 7/2002 | Seaman | 715/210 |
| 6,489,970 B1 | | 12/2002 | Pazel | |
| 6,628,286 B1 | * | 9/2003 | Comair et al. | 345/473 |
| 6,747,650 B2 | * | 6/2004 | Turner et al. | 345/473 |
| 6,826,727 B1 | * | 11/2004 | Mohr et al. | 715/235 |
| 6,999,637 B1 | * | 2/2006 | Anderson et al. | 382/311 |
| 7,178,112 B1 | * | 2/2007 | Ciolfi et al. | 716/1 |
| 7,343,320 B1 | * | 3/2008 | Treyz et al. | 705/26.5 |
| 7,844,896 B2 | * | 11/2010 | Ohashi et al. | 715/243 |
| 2002/0109668 A1 | * | 8/2002 | Rosenberg et al. | 345/156 |
| 2003/0093493 A1 | * | 5/2003 | Watanabe et al. | 709/217 |
| 2004/0163047 A1 | * | 8/2004 | Nagahara et al. | 715/517 |
| 2005/0094207 A1 | * | 5/2005 | Lo et al. | 358/1.18 |
| 2005/0172224 A1 | * | 8/2005 | Kobashi et al. | 715/517 |
| 2007/0008589 A1 | * | 1/2007 | Ushio et al. | 358/304 |

OTHER PUBLICATIONS

Lee, K., 'Inside 3ds max® 4, QUE, Aug. 6, 2001, spring sections of chapter 3.*

* cited by examiner

*Primary Examiner* — Thu Huynh
(74) *Attorney, Agent, or Firm* — Wolfe-SBMC (57) ABSTRACT

Briefly, in accordance with one embodiment of the invention, an object may be utilized to define, communicate, and/or control a spatial relationship between at least two other objects. Such an object may be somewhat analogous to a spring in that a minimum margin between the two other objects may be defined to allow the two other objects to approach one another until the minimum margin is reached, and a flexible margin may allow movement of the two other objects within the flexible margin relative to each other, optionally up to a maximum distance of separation.

28 Claims, 5 Drawing Sheets

USER INTERFACE TO DEFINE AND/OR COMMUNICATE SPACE BETWEEN OBJECTS

BACKGROUND

In computer programs utilized to control the layout of a page and/or displayed information, for example a publishing type program, a graphical user interface may be utilized to display, edit, and/or manipulate objects contained in the page and/or display, where manipulate may mean, for example, control by and/or in response to a user, and/or control by and/or in response to software code, instructions, and/or a command. Such objects may include, for example, text objects to contain and/or control the layout and/or appearance of text within the object, graphic objects to contain and/or control the layout and/or appearance of graphics and/or images within the object, and/or frames utilized as a border and/or perimeter of another object. During editing, one object may be moved within the layout and/or resized, which may result in the moved and/or resized object encroaching upon another object or being moved too far away from another related object. Thus, such manipulation of one object may invariable result in the user needing to manipulate one or more other objects to accommodate such changes, for example in order to preserve the gist of the original layout and/or the previously established relationship among the objects.

DESCRIPTION OF THE DRAWING FIGURES

Claimed subject matter is particularly pointed out and distinctly claimed in the concluding portion of the specification. However, both as to organization and/or method of operation, together with features, and/or aspects thereof, may best be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to, such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system and/or computing platform, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, a software entity may comprise computer code and/or data to perform at least one or more functions, when executed, and/or which may be tangibly embodied in computer code and/or data stored, at least temporarily, on a computer and/or machine readable medium and/or in memory, and which may include, for example, but is not limited to, an object. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like.

In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiments, transient may refer to being in a state for a brief and/or temporary period of time, and/or passing with time and/or a temporary state of being. In one or more embodiments, an icon may refer to a smaller sized picture that may represent an object, a file, and/or a program, and in some embodiments, an icon may be a thumbnail, wherein a thumbnail may refer to a smaller sized image and/or picture of an object, a file, and/or a program, and/or a portion thereof. However, these are merely example definitions of terms relating to graphical user interfaces and/or computing platforms and/or the like, and the scope of claimed subject matter is not limited in this respect.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

Figure 1:
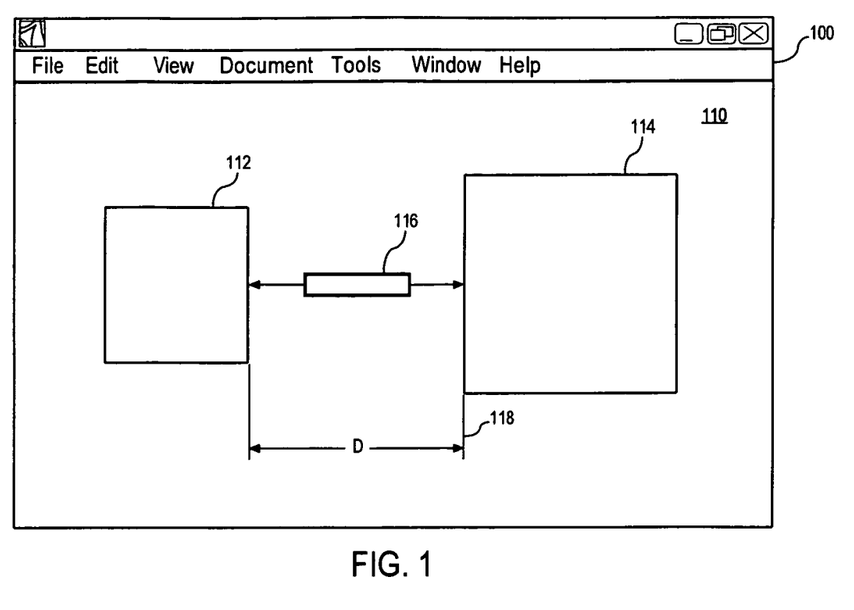
FIG. 1 is a diagram of a computer program having a user interface to define and/or communicate space between objects in accordance with one or more embodiments.

Referring now to FIG. 1, a diagram of a computer program having a user interface to define and/or communicate space between objects in accordance with one or more embodiments will be discussed. As shown in FIG. 1, computer program 100 may include graphical user interface (GUI) 110 to display, edit, and/or manipulate information including, but not limited to, for example, object 112 and/or object 114. In accordance with one or more embodiments, an additional object, spring 116, may be utilized to define and/or communicate space between object 112 and object 114. Computer program 100 may be for example, Adobe® InDesign® CS2 available from Adobe Systems Incorporated of San Jose, Calif., USA, or similar type of computer program, although the scope of the claimed subject matter is not limited in this respect. In at least one or more embodiments, as one or more of object 112 and/or object 114 are moved, repositioned, resized, reflowed, and/or otherwise manipulated by a user using graphical user interface 110, spring 116 may define a distance (D) 118 between object 112 and/or object 114 as part of defining and/or communicating such a spatial relationship. In one or more embodiments, such an object and/or frame may be manipulated by a user via graphical user interface 110. In an alternative embodiment, such an object and/or frame may be manipulated by an automated process executed, for example, by computer program 100, a server, a servlet, an applet, an application program interface (API), and/or a process, and so on, that may automatically insert content into and/or manipulate content contained in such an object and/or frame, for example according to a template. In one or more embodiments, spring 116, and/or any spring-like object, may be defined as an item that may define a space and/or a spatial relationship between objects, for example between object 112 and/or object 114. In one or more embodiments, a spring such as spring 116 may be an object having properties to define and/or communicate a relationship between objects, for example object 112 and/or object 114. One or more of object 112 and/or object 114 may be a frame, which may be defined as an object that may contain information, for example text, graphics, and/or nothing at all. A text frame may be utilized, for example, to determine an area to be occupied by text, and/or how text will be placed within a layout. A graphics frame may be utilized, for example, as a border and/or background, and further may be utilized to crop and/or mask a graphic and/or image. In one or more embodiment, a frame may be utilized as an empty place holder, and in one particular embodiment, an empty graphics frame may display a crossbar to indicate that the graphics frame is empty. In one particular embodiment, a frame and/or object may have an attribute to define space in a penumbral region surrounding a perimeter of the frame and/or object, where such attribute may be referred to as a bumper. However, these are merely examples of a spring, object, and/or frame, and/or bumper, and the scope of the claimed subject matter is not limited in these respects.

In accordance with one or more embodiments, spring 116 may define a spatial relationship between objects, such as object 112 and/or object 114, when at least one of the objects is manipulated to decrease distance 118 between object 112 and/or object 114. Furthermore, spring 116 may define a spatial relationship between objects, such as object 112 and/or object 114, when at least one of the objects is manipulated to increase distance 118 between object 112 and/or object 114. Additionally, spring 116 may define a spatial relationship between objects, such as object 112 and/or object 114, when at least one of the objects is manipulated to increase and/or decrease distance 118 between object 112 and/or object 114, in combination. In one or more such embodiments, spring 116 may be analogized to a mechanical spring. For example, for increasing distance 118 between object 112 and/or object 114, spring 116 may allow distance 118 to increase up to a predefined limit. In such a mechanical spring analogy, the tensile stretching of the spring may have a mechanical limit beyond which mechanical failure and/or deformation of the spring may occur, which may provide at least a practical operating limit on the distance between apart two ends of the spring may be stretched. For another example, for decreasing distance between object 112 and/or object 114, spring 116 may allow such decrease in distance between object 112 and/or object 114 until a minimum distance between object 112 and/or object 114 is reached. In such a mechanical spring analogy, the compression of the spring may have a mechanical limit beyond mechanical failure and/or deformation of the spring may occur, which may provide at least a practical operating limit on the minimum distance two ends of the spring may be brought together. Although a mechanical spring analogy may be useful to provide a description at least in part of operation of spring 116, such an analogy is merely an example, and the scope of the claimed subject matter is not limited in this respect. For example, since spring 116 may be defined in software for graphical user interface 110 of computer program 100, spring 116 may be programmed to have one or more attributes that may not have any corresponding mechanical and/or physical analogy, and/or may be programmed in some embodiments to have no corresponding mechanical and/or physical analogy, and the scope of the claimed subject matter is not limited in this respect.

Figure 2:
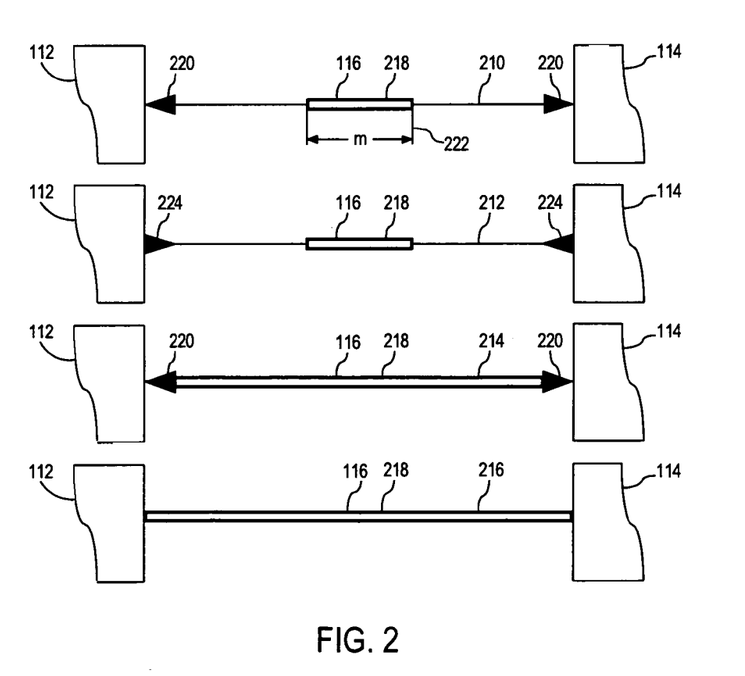
FIG. 2 is a diagram of various versions of a spring to define and/or communicate space between objects in accordance with one or more embodiments.

Referring now to FIG. 2, a diagram of various versions of a spring to define and/or communicate space between objects in accordance with one or more embodiments will be discussed. As shown in FIG. 2, spring 116 may be defined having various attributes to define one or more of various versions of spring 116. In one or more embodiments, the various versions of spring 116 may be visually and/or graphically depicted by graphical user interface 110, for example when spring 116 is optionally displayed in graphical user interface 110. Version 210 of spring 116 may define a minimum distance (m) 222 between object 112 and/or object 114, where such minimum distance 222 may be represented by margin element 218 of version 210. Further with version 210, outwardly pointing arrows may represent, besides minimum distance 222 of margin element 218, that flexible margin element 220 may be defined where objects 112 and/or 114 may still be manipulated to increase distance 118 between the objects. Likewise, version 212 of spring 116 may include similar attributes of version 210, however as shown in version 212, distance 118 between object 112 and/or object 114 has reached a maximum defined distance, and distance 118 between the objects may not be increased. Such a maximum distance may be indicated, for example, by inwardly pointing arrows of flexible margin element 224. Version 214 of spring 116 may include minimum margin element 218, where distance 118 between object 112 and/or 114 may not be further decreased, however outwardly pointing arrows may indicate flexible margin 220 may be available to allow for an increase in distance 118 between object 112 and/or object 114. Version 216 of spring 116 may indicate a minimum margin represented by minimum margin element 216, and the absence of arrows at either end of minimum margin element may indicate the absence of any flexible margin. Thus, in one embodiment, version 216 of spring 116 may represent that distance 118 between element 112 and/or element 114 may be a fixed distance. Version 210, version 212, version 214, and/or version 216 of spring 116 are merely examples of how one or more attributes of spring 116 may be defined and/or graphically represented using graphical user interface 110, and the scope of the claimed subject matter is not limited in these respects. Similarly, other versions of spring 116 may be utilized, for example where spring may comprise margin element 218 on one side coupled to one object, and a flexible margin element represented by a single arrow 220 on another side coupled to another object, and/or where spring may comprise flexible margin element 220 or 224 being centrally disposed and flanked on either side by two of margin element 218 each coupled to a respective one of the objects, and the scope of the claimed subject matter is not limited by these respects.

In one or more embodiments, spring 116 may allow for an unlimited distance 118 of separation between objects with a minimum margin of separation. In one or more alternative embodiments, spring 116 may have no minimum margin of separation, but a maximum distance of separation between objects. In another embodiment, spring 116 may have both a minimum margin of separation and a maximum distance of separation between objects. In yet another embodiment, spring 116 may have a fixed amount of separation between objects. Such attributes of spring 116 may be selected by a user, for example using graphical user interface 110, and furthermore such attributes may be changed by the user as desired. However, these are merely example attributes of spring 116, and the scope of the claimed subject matter is not limited in these respects.

Figure 3:
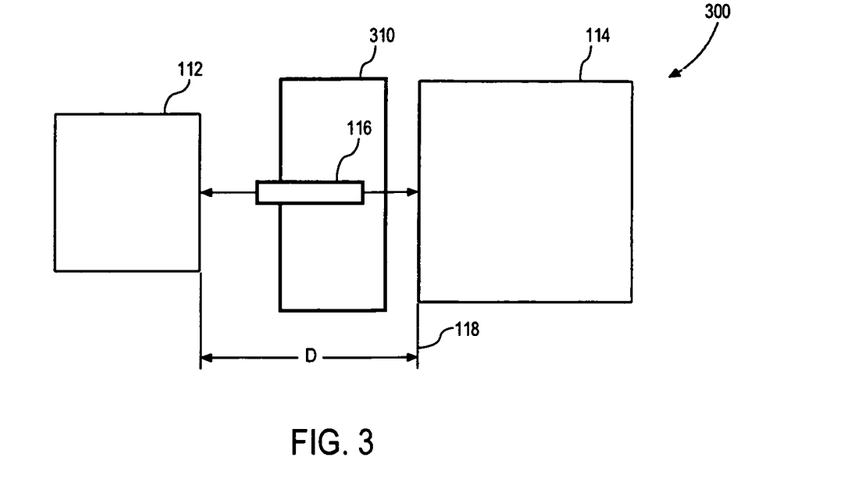
FIG. 3 is a diagram of a spring to define and/or communicate space between objects with respect to at least another object in accordance with one or more embodiments.

Referring now to FIG. 3, a diagram of a spring to define and/or communicate space between objects with respect to at least another object in accordance with one or more embodiments will be discussed. As shown in FIG. 3 in embodiment 300, in some instances, an object, such as object 310, by be interposed between two objects, such as object 112 and/or object 114, where the two objects may utilize spring 116 to define and/or communicate a spatial relationship between the two objects. In such an embodiment, at least one of object 112 and/or object 114 may be manipulated to increase and/or decrease distance 118 between object 112 and/or object 114, where a spatial relationship between object 112 and/or object 114 may be defined, communicated, and/or otherwise controlled without regard to any relationship between object 112 and/or object 310, and/or without regard to any relationship between object 114 and/or object 310. For example, spring 116 may provide a minimum margin between object 112 and/or object 114, wherein object 112 and/or object 114 may be prevented from being disposed apart at a distance closer than the minimum margin. However, spring 116 may not prevent either of object 112 and/or object 114 from being disposed apart at any distance, and may even end up encroaching and/or overlapping object 310. In one embodiment, graphical user interface 110 may provide one or more alternative mechanisms to control a relationship between object 112 and/or object 114, for example using bumpers, where such an alternative mechanism and/or mechanism may operate independently of the operation of spring 116, although the scope of the claimed subject matter is not limited in this respect.

Figure 4:
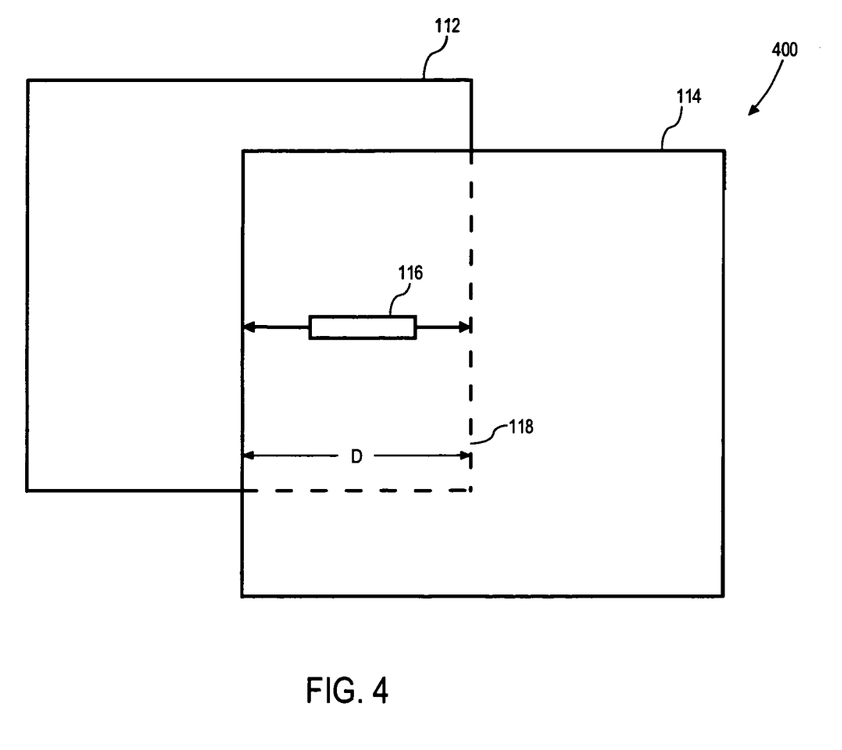
FIG. 4 is a diagram of a spring to define and/or communicate space between objects where the objects may overlap at least in part in accordance with one or more embodiments.

Referring now to FIG. 4, a diagram of a spring to define and/or communicate space between objects where the objects may overlap at least in part in accordance with one or more embodiments will be discussed. As shown in FIG. 4 in embodiment 400, object 112 may overlap at least in part with object 114. In such an embodiment, spring 116 may be utilized to define and/or communicate and/or otherwise control a spatial relationship between object 112 and/or object 114. In one or more embodiments, such distance (D) 118 between object 112 and/or object 114 may be defined as having a negative value in an overlap situation. In other words, if a distance between object 112 and/or object 114 is defined as having a positive value in the event where there is some space disposed between object 112 and/or object 114, then when object 112 and/or object 114 overlap at least in part, a distance of separation provided by such overlap may be defined as having a negative value. In such an embodiment 400, a spatial relationship between object 112 and/or object 114 may be defined and/or communicated and/or otherwise controlled by spring 116. For example, an amount of overlap between object 112 and/or object 114 may be limited to a minimum value, where for example the absolute value of distance (D) 118 may be a minimum value, and furthermore may provide an amount of flexibility to increase distance (D) 118 to a maximum absolute value. However, these are merely examples of how spring 116 may define and/or communicate and/or otherwise control a spatial relationship between objects when the objects overlap at least in part, and the scope of the claimed subject matter is not limited in this respect.

Figure 5:
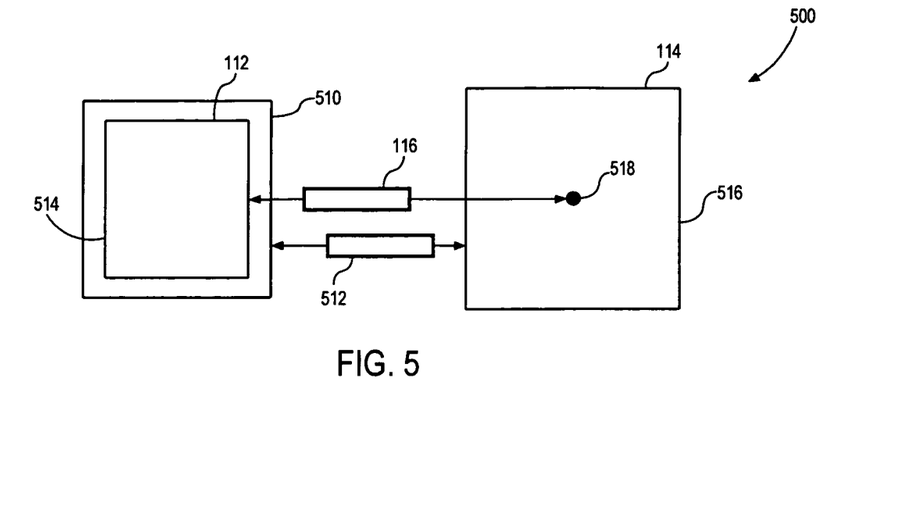
FIG. 5 is a diagram of a spring to define and/or communicate space between objects where at least one of the objects may include a frame in accordance with one or more embodiments.

Referring now to FIG. 5, a diagram of a spring to define and/or communicate space between objects where at least one of the objects may include a frame in accordance with one or more embodiments will be discussed. As shown in embodiment 500 of FIG. 5, at least one of the objects, for example object 112, may include frame 510. Optionally, spatial relationship between object 112 and/or object 114 may be defined, communicated, and/or controlled via coupling of spring 116 to object 112 itself, as shown using spring 116, and/or to frame 510, as shown using spring 512. For example, where frame 510 may be a decorative border framing a graphic contained in object 112, it may be desirable to define, communicate, and/or control the spatial relationship between object 112 and/or object 114 by taking into account the presence of frame 510 around object 112. This may be helpful, for example, to ensure that object 114 does not unintentionally overlap frame 510 event though spring 116 otherwise might be arranged to prevent object 114 from overlapping object 112. Thus a user may optionally select to couple a spring, such as spring 116, directly to object 112, and/or may optionally select to couple a spring, such as spring 512, to frame 510 that may be associated with object 112. In one particular embodiment, a user may optionally select to couple a first spring, such as spring 116, between object 114 and object 112, and to couple a second spring, such as spring 512, between object 114 and frame 510. For example, a user may wish to do so where it may be desirable to provide a different relationship between object 112 and/or object 114, and between object 114 and/or frame 510.

In one or more embodiments, spring 116 may couple to object 112 and/or object 114 to any one or more points corresponding to object 112 and/or object 114. For example, predefined points along perimeter 514 of object 112 and/or perimeter 516 of object 114 may allow for an end of spring 116 to couple to any one of the predefined points. In another embodiment, at least one of object 112 and/or spring 114 may allow an end of spring 116 to couple to any one of a continuous number of points along perimeter 514 of object 112 and/or perimeter 516 of object 114. In yet another embodiment, object 112 and/or object 114 may be arranged to allow an end of spring 116 to couple to central point 518 disposed in an interior region of object 112 and/or object 114. In an alternative embodiment object 112 and/or object 114 may be arranged to allow an end of spring 116 to couple to any point of and/or corresponding to object 112 and/or object 114. In one or more alternative embodiments, spring 116 may connect one or more objects to other elements that may not be objects. For example, at least one end of spring 116 may couple to a specified coordinate in a page of computer program 100, for example were a user specifies an x, y coordinate to which an end of spring may connect, or alternatively may use graphical user interface 110 to manipulate a coordinate to which an end of spring 116 may couple. Likewise, an end of spring 116 may couple to a margin, a page edge, and so on, and/or to any other feature or element of a page of computer program 100 and/or any other element specified by graphical user interface 110. However, these are merely examples of how and/or where spring 116 may couple to object 112 and/or object 114, and the scope of the claimed subject matter is not limited in these respects.

Figure 6:
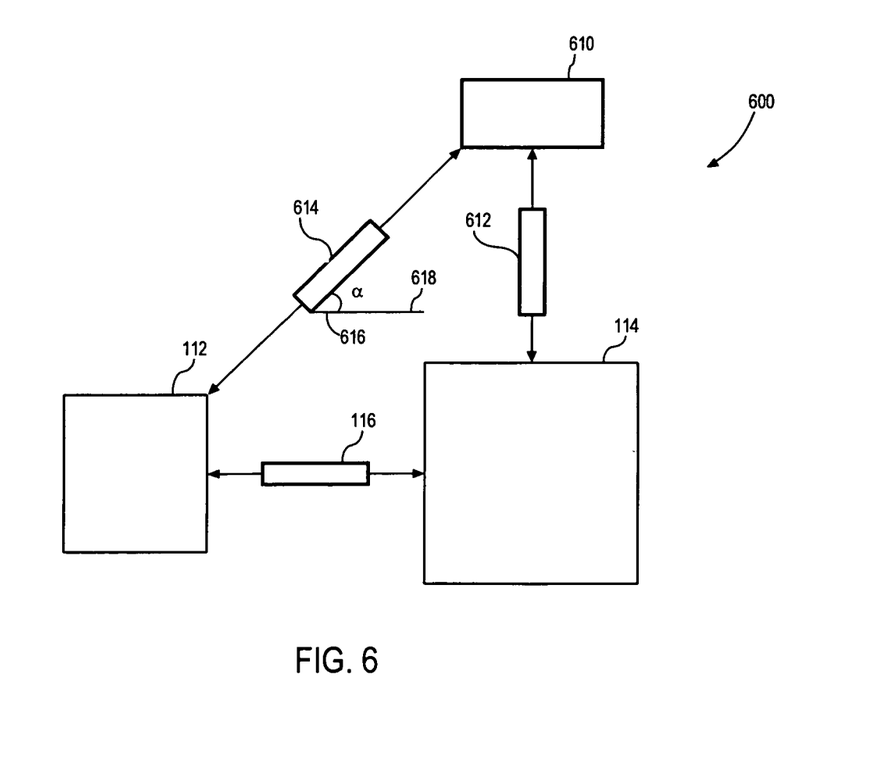
FIG. 6 is a diagram of is a diagram of two or more springs to define and/or communicate space between two or more objects in accordance with one or more embodiments.

Referring now to FIG. 6, a diagram of two or more springs to define and/or communicate space between two or more objects in accordance with one or more embodiments will be discussed. As shown in embodiment 600 of FIG. 6, a first spring, such as spring 116, may couple between object 112 and/or object 114 as discussed herein. Similarly, a second spring, such as spring 612, may couple between object 114 and/or object 610. Similarly, a third spring, such as spring 614, may couple between object 112 and/or object 610. In such an arrangement, at least one or more of the springs may operate separately and independently with respect to the other springs based at least in part on one or more attributes ascribed to the springs by the user for example. In one particular embodiment, one or more of the springs may be ascribed an attribute corresponding to an angle of rotation of the spring, for example angle (α) 616, with respect to a reference, for example reference 618. Such an angle of rotation may be fixed, and/or may be flexible within a minimum and/or a maximum amount of rotation. In yet another alternative embodiment, at least one or more of the springs may be ascribed an attribute corresponding to an angle of rotation of the spring with respect to at least one other of the springs. Such an angle of rotation may be fixed, and/or may be flexible within a minimum and/or a maximum amount of rotation. Thus, one or more such arrangements of objects as shown in FIG. 6 may be defined wherein spatial relationships between multiple objects, such as object 112, object 114, and/or object 610 may be defined, communicated, and/or controlled, either independently, independently at least in part, and/or in combination. Furthermore, although as shown at least in FIG. 6, a distance relationship and/or an angular relationship may be defined, for example in a two-dimensional plane, wherein such relationship definition, communication, and/or control may be provided in any dimensional environment provided by graphical user interface 110, for example in a three-dimensional environment of a computer graphics game and/or computer aided design (CAD) computer program. However, these are merely examples of how one or more springs may be utilized to define, communicate, and/or control a relationship between two or more objects, and the scope of the claimed subject matter is not limited in these respects.

Figure 7:
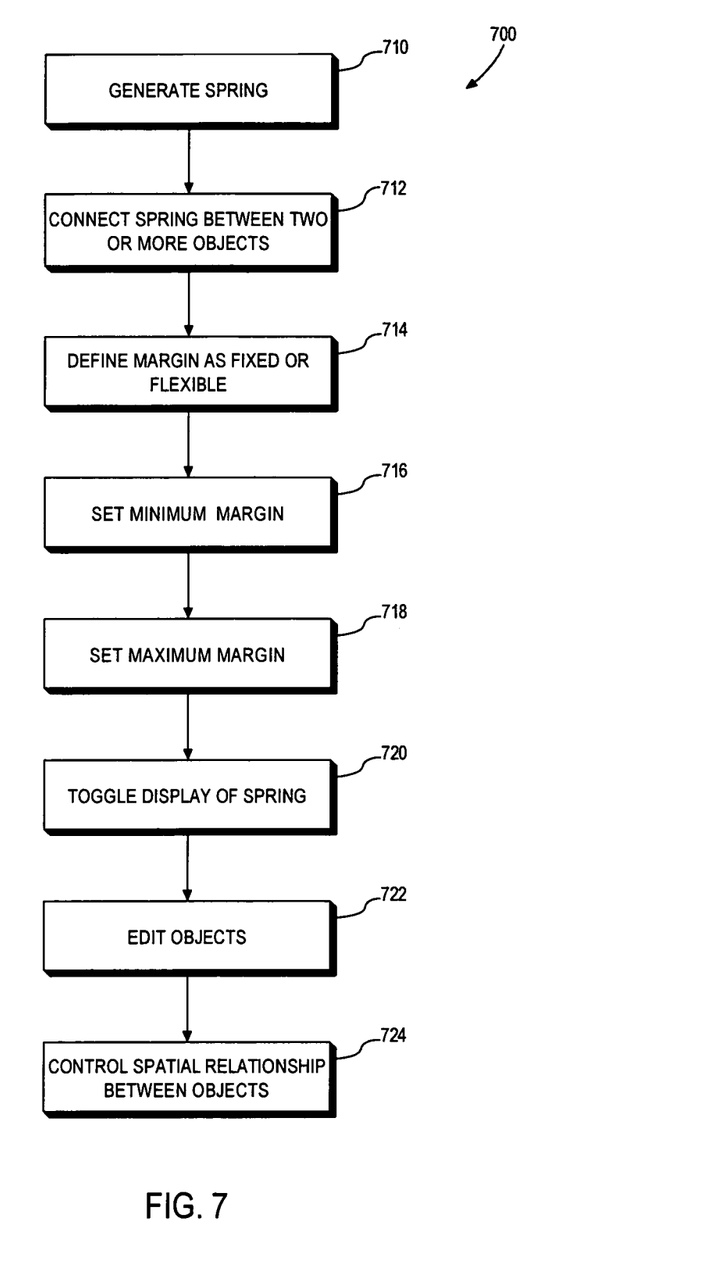
FIG. 7 is a flow diagram of a method to define and/or communicate space between objects in accordance with one or more embodiments.

Referring now to FIG. 7, a flow diagram of a method to define- and/or communicate space between objects in accordance with one or more embodiments will be discussed. Method 700 as shown in FIG. 7 is merely one example of how a spring may be utilized in a graphical user interface to define, communicate, and/or control a spatial relationship between objects in accordance with one or more embodiments of the invention. The blocks of method 700 may be arranged in one or more alternative orders, and method 700 may include fewer or more blocks than shown in FIG. 7, and the scope of the claimed subject matter is not limited in these respects. Method 700 may include block 710 at which a spring, such as spring 116, may be generated by a user using graphical user interface 110. Spring 116 may be connected between two or more objects at block 712. The user may define a margin of spring 116 as being fixed or flexible at block 714. If the margin is flexible, a user may optionally select a minimum margin at block 716. Likewise a maximum margin may be optionally selected at block 718. In the case where the margin is fixed as selected at block 714, the minimum margin and the maximum margin would be the same, fixed margin. At block 720, a user may toggle the display of spring 116. For example, during editing and/or arranging of the objects in graphical user interface 110, a user may wish to view one or more springs to help understand how manipulation of one object may affect one or more other objects. When editing and/or arranging is complete, the user may toggle the display of the springs wherein the springs may be hidden from view in graphical user interface 110. Alternatively, a user may toggle the display of the spring to be hidden from view during editing and/or arranging of the objects, and merely determine a spatial relationship between the objects due to the springs based on observation of an effect that manipulation of one object may have on another object. In any event, objects may be edited and/or arranged at block 722 using graphical user interface 110, where graphical user interface 110 may control a spatial relationship among one or more of the objects at block 724. Method 700 is merely one example of how one or more springs may be utilized to define, communicate, and/or control space between objects in accordance with one or more embodiments, for example using a graphical user interface, and the scope of the claimed subject matter is not limited in this respect. Although a graphical user interface such as graphical user interface 110 may be utilized for such definition, communication, and/or control, it should be noted that other mechanisms and/or interfaces may likewise be utilized, for example an audio user interface, a keyboard user interface, and so on, and the scope of the claimed subject matter is not limited in this respect.

Figure 8:
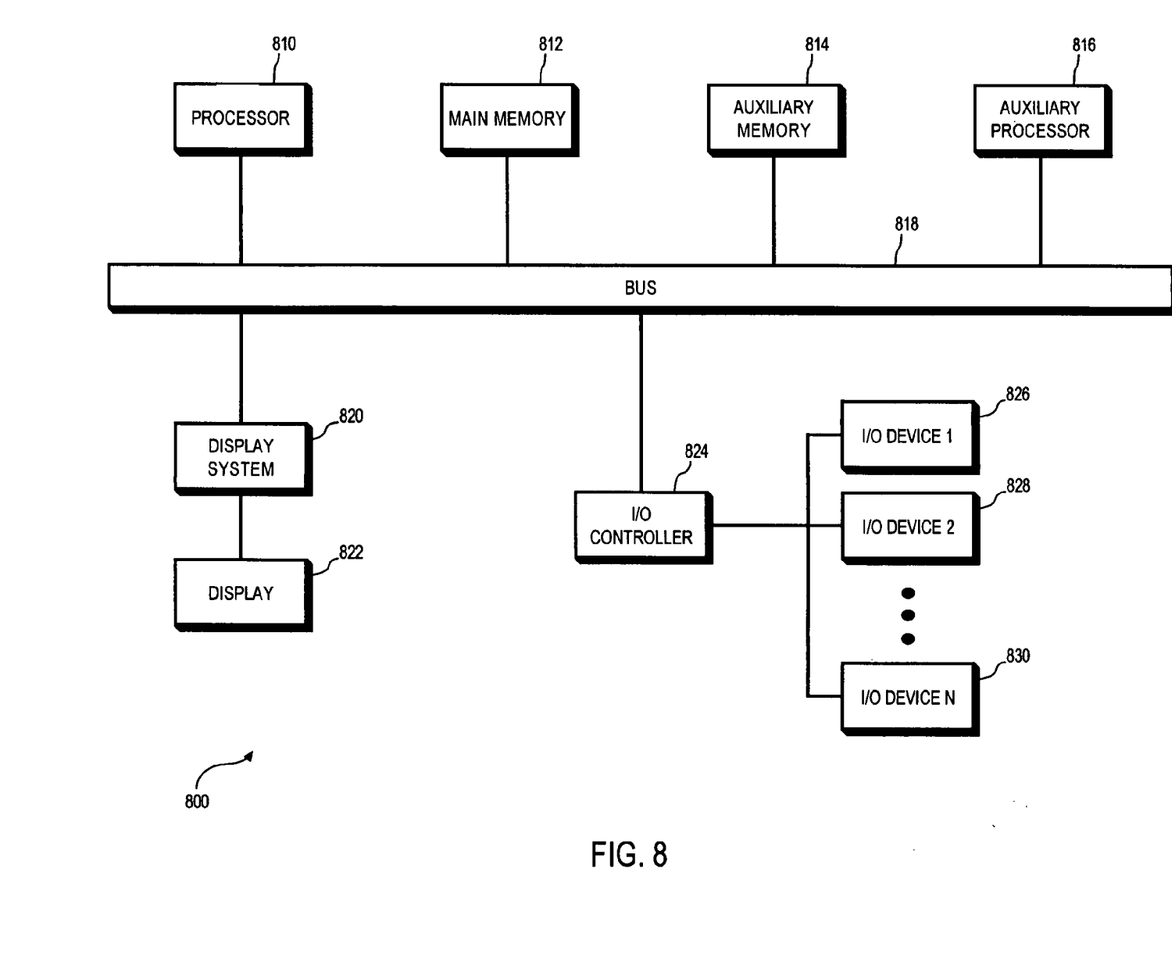
FIG. 8 is a block diagram of an information handling system able to define and/or communicate space between objects in accordance with one or more embodiments.

Referring now to FIG. 8, a block diagram of an information handling system able to define and/or communicate space between objects in accordance with one or more embodiments will be discussed. Information handling system 800 may be utilized to tangibly embody computer program 100 and/or graphical user interface 110 of FIG. 1 by providing hardware components on which computer program 100 and/or graphical user interface 110 may be executed. As shown in FIG. 8, information handling system 800 may be controlled by processor 810. Processor 810 may comprise a central processing unit such as a microprocessor or microcontroller for executing programs, performing data manipulations and controlling the tasks of information handling system 800. Communication with processor 800 may be implemented via bus 818 for transferring information among the components of information handling system 800. Bus 818 may include a data channel for facilitating information transfer between storage and other peripheral components of information handling system 818. Bus 818 further may provide a set of signals utilized for communication with processor 810, including, for example, a data bus, and address bus, and/or a control bus. Bus 818 may comprise any bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 812, and/or auxiliary memory 814. Information handling system 800 may further comprise auxiliary processing processor 816, which may be another processor, a digital signal processor, and so on. Main memory 812 may provide storage of instructions and data for programs to be executed by processor 810. Main memory 812 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Auxiliary memory 812 may be utilized to store instructions and/or data that to be loaded into main memory 812 before execution. Auxiliary memory 814 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 814 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 800 optionally include auxiliary processor 816 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave type processor subordinate to processor 810, an additional microprocessor and/or controller for dual and/or multiple processor systems, and/or a coprocessor and/or additional processor. Such auxiliary processors may be discrete processors and/or or may be arranged in the same package as processor 810, for example in a multicore and/or multithreaded processor, however the scope of the claimed subject matter is not limited in these respects.

Information handling system 800 further may include display system 820 for connecting to display 822, and further may include input/output (I/O) controller 824 to connect to one or more I/O devices including, for example, I/O device 826, I/O device 828, up to an Nth I/O device, I/O device 830. Display system 820 may comprise a video display adapter having components for driving display 822, including, for example, video memory, a buffer, and/or a graphics engine. Such video memory may be, for example, video random access memory (VRAM), synchronous graphics random access memory (SGRAM), windows random access memory (WRAM), and/or the like. Display 822 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 824 may comprise one or more controllers and/or adapters to prove interface functions between one or more of I/O device 826, I/O device 828, and/or I/O device 830. For example, input/output controller 824 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like. Input/output controller 824 and/or I/O device 826, I/O device 828, and/or I/O device 830 may provide and/or receive analog and/or digital signals to communicate between information handling system and external devices, networks, and/or information sources. Input/output controller 824 and/or I/O device 826, I/O device 828, and/or I/O device 830 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 800 of FIG. 8 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that a user interface to define and/or communicate space between objects and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:
1. An apparatus, comprising:
one or more processors; and
one or more computer-readable storage media storing instructions that are executable by the one or more processors to:
provide a graphical user interface;
define a first object that indicates a spatial relationship between a second object and a third object in the graphical user interface, the first object defined by limits of the spatial relationship that are configurable to include a minimum limit and a maximum limit to which the spatial relationship between the second object and the third object is restricted;
display the first object in the graphical user interface, the first object configured to visually indicate the minimum limit using a margin element having a length that corresponds to the minimum limit, and to visually indicate that decreasing the spatial relationship beyond the minimum limit and increasing the spatial relationship beyond the maximum limit are prohibited, the first object configured to visually indicate the maximum limit concurrently with the minimum limit responsive to manipulation that attempts to increase the spatial relationship beyond the maximum limit; and
in response to manipulation of at least one of the second object or the third object that changes the spatial relationship between the second object and the third object, update the display of the first object based on the manipulation of the at least one of the second object or the third object.

2. The apparatus as claimed in claim 1, wherein at least one of the second object or the third object is at least one of a fixed coordinate, a border, a center, a text object, a graphic object, a margin, an edge, or a frame.

3. The apparatus as claimed in claim 1, wherein the maximum limit is a maximum distance and the first object is flexible up to the maximum distance.

4. The apparatus as claimed in claim 1, wherein the minimum limit is a minimum distance and the maximum limit is a maximum distance and the spatial relationship between the second object and the third object is based at least in part on both the minimum distance and the maximum distance.

5. The apparatus as claimed in claim 4, wherein the minimum distance is set to zero distance units.

6. The apparatus as claimed in claim 1, wherein:
the first object is configured to visually indicate that decreasing the spatial relationship beyond the minimum limit is prohibited when a distance between the second object and the third object is equal to the minimum limit of the spatial relationship; and
the first object is configured to visually indicate that increasing the spatial relationship beyond the maximum limit is prohibited when the distance between the second object and the third object is equal to the maximum limit of the spatial relationship.

7. An apparatus, comprising:
one or more processors; and
one or more computer readable storage media storing instructions that are executable by the one or more processors to:
provide a graphical user interface;
display a first object in the graphical user interface;
display a second object in the graphical user interface;
define a spatial object in the graphical user interface that indicates a spatial relationship between the first object and the second object, the spatial object defined by limits of the spatial relationship that are configurable to include a minimum limit and a maximum limit of the spatial relationship,
display the spatial object in the graphical user interface, the spatial object configured to visually indicate the minimum limit using a margin element having a length that corresponds to the minimum limit, and to visually indicate that decreasing the spatial relationship beyond the minimum limit and increasing the spatial relationship beyond the maximum limit are prohibited, the spatial object configured to visually indicate the maximum limit concurrently with the minimum limit responsive to manipulation that attempts to increase the spatial relationship beyond a length that corresponds to the maximum limit;
modify the spatial relationship between the first object and the second object in the graphical user interface in response to a manipulation of the first object or the second object that is limited by the limits of the spatial relationship; and
in response to the manipulation, update the display of the spatial object based on the manipulation of the first object or the second object.

8. A method, comprising:
defining a first object that indicates a spatial relationship between a second object and a third object based on specified limits to a distance or an angle between the second object and the third object, the limits being configurable to include a minimum limit and a maximum limit of the spatial relationship;
generating a graphical user interface to display the first object, the second object, and the third object to visually indicate the spatial relationship between the second object and the third object, including using the first object to visually indicate:
the minimum limit with a margin element having a length that corresponds to the minimum limit;
that decreasing the spatial relationship beyond the minimum limit and increasing the spatial relationship beyond the maximum limit are prohibited; and
the maximum limit by changing an appearance of flexible margin elements responsive to manipulation that attempts to increase the spatial relationship beyond a length that corresponds to the maximum limit, the minimum limit being visually indicated concurrently when the maximum limit is visually indicated; and
manipulating at least one of the second object or the third object in the graphical user interface, the manipulating causing the spatial relationship between the second object and the third object to change; and
in response to the manipulating, causing the graphical user interface to display the first object to indicate the manipulating and to indicate the change to the spatial relationship between the second object and the third object.

9. The method as claimed in claim 8, wherein the minimum limit defines a minimum distance of separation between the second object and the third object and wherein the second object and the third object are freely movable within the limits of the spatial relationship.

10. The method as claimed in claim 8, further comprising coupling at least one end of the first object to at least one of the second object or the third object in the graphical user interface.

11. The method as claimed in claim 8, further comprising at least one of:
setting the minimum limit of the spatial relationship to zero distance units; or
setting the maximum limit of the spatial relationship to a predefined maximum value.

12. The method as claimed in claim 8, wherein:
the first object is configured to visually indicate that decreasing the spatial relationship beyond the minimum limit is prohibited when the distance between the second object and the third object is equal to the minimum limit of the spatial relationship; and
the first object is configured to visually indicate that increasing the spatial relationship beyond the maximum limit is prohibited when the distance between the second object and the third object is equal to the maximum limit of the spatial relationship.

13. The method as claimed in claim 8, further comprising hiding the first object to selectively display the first object in the graphical user interface.

14. A method, comprising:
displaying a first object in a graphical user interface of a computing platform;
displaying a second object in the graphical user interface;
defining a spatial object which indicates a spatial relationship between the first object and the second object based on specified limits to a distance or an angle between the first object and the second object, the limits being configurable to include a minimum limit and a maximum limit of the spatial relationship;

displaying the spatial object in the graphical user interface to visually indicate the spatial relationship between the first object and the second object, including using the spatial object to visually indicate that decreasing the spatial relationship beyond the minimum limit and increasing the spatial relationship beyond the maximum limit are prohibited and using the spatial object to visually indicate the maximum limit by changing an appearance of flexible margin elements of the spatial object responsive to manipulation that attempts to increase the spatial relationship beyond the maximum limit, the minimum limit being visually indicated concurrently when the maximum limit is visually indicated;

modifying the spatial relationship between the first object and the second object in the graphical user interface in response to a manipulation of the first object or the second object that is limited by the limits of the spatial relationship; and in response to the modifying, updating the display of the spatial object based on the manipulation of the first object or the second object.

15. The method as claimed in claim 14, wherein the graphical user interface provides an option to display the spatial object in the graphical user interface.

16. The method as claimed in claim 14, wherein limiting the manipulation of the first object and the second object comprises at least one of:

limiting the manipulation of the first object or the second object such that a distance between the first object and the second object remains greater than or equal to a minimum distance specified by the minimum limit of the spatial relationship;

limiting the manipulation of the first object or the second object such that the distance between the first object and the second object remains less than or equal to a maximum distance specified by the maximum limit of the spatial relationship; or repositioning one of the first object or the second object when a different one of the first object or the second object is manipulated beyond the limits of the spatial relationship, wherein the repositioning repositions the first object or the second object to comply with the limits of the spatial relationship.

17. A computer-readable memory having instructions stored thereon that are executable by a computing platform to perform operations comprising:

defining a first object that indicates a spatial relationship between a second object and a third object, the spatial relationship is defined to limit movement of the first object and the second object, relative one to another, and is based on limits that are configurable to include a minimum limit and a maximum of the spatial relationship;

generating a graphical user interface to display the first object, the second object, and the third object to visually indicate the minimum limit using a margin element having a length that corresponds to the minimum limit, and to visually indicate the spatial relationship between the second object and the third object, including using the first object to visually indicate that decreasing the spatial relationship beyond the minimum limit and increasing the spatial relationship beyond the maximum limit are prohibited, the first object configured to visually indicate the maximum limit concurrently with the minimum limit responsive to manipulation that attempts to increase the spatial relationship beyond the maximum limit;

manipulating at least one of the second object or the third object, the manipulating causing the spatial relationship between the second object and the third object to change; and in response to the manipulating, causing the graphical user interface to display the first object to indicate the manipulating and to indicate the change to the spatial relationship between the second object and the third object.

18. The computer-readable memory as claimed in claim 17, wherein the minimum limit defines a minimum distance of separation between the second object and the third object or defines a minimum angle at which the second object can be positioned relative to the third object.

19. The computer-readable memory as claimed in claim 17, wherein the operations further comprise coupling at least one end of the first object to at least one of the second object or the third object.

20. The computer-readable memory as claimed in claim 17, wherein the operations further comprise setting at least one of the minimum limit of the spatial relationship to zero distance units or the maximum limit of the spatial relationship to a maximum predefined value.

21. The computer-readable memory as claimed in claim 17, wherein:

the first object is configured to visually indicate that decreasing the spatial relationship beyond the minimum limit is prohibited when a distance between the second object and the third object is equal to the minimum limit of the spatial relationship; and the first object is configured to visually indicate that increasing the spatial relationship beyond the maximum limit is prohibited when the distance between the second object and the third object is equal to the maximum limit of the spatial relationship.

22. The computer-readable memory as claimed in claim 17, wherein the operations further comprise hiding the first object to selectively display the first object in the graphical user interface.

23. A computer-readable memory having instructions stored thereon that are executable by a computing platform to perform operations comprising:

displaying a first object in a graphical user interface of the computing platform;

displaying a second object in the graphical user interface;

defining a spatial object that indicates a spatial relationship between the first object and the second object, the spatial object defined by limits of the spatial relationship that are configurable to include a minimum limit and a maximum limit of the spatial relationship and when displayed configured to visually indicate:

the minimum limit using a margin element of the spatial object that has a length corresponding to the minimum limit;

that decreasing the spatial relationship beyond the minimum limit and increasing the spatial relationship beyond the maximum limit are prohibited; and the maximum limit by changing an appearance of flexible margin elements of the spatial object responsive to manipulation that attempts to increase the spatial relationship beyond the maximum limit, the minimum limit being visually indicated concurrently when the maximum limit is visually indicated; and modifying the spatial relationship between the first object and the second object in the graphical user interface in response to a manipulation of the first object or the second object that is limited by the limits of the spatial relationship; and in response to the manipulation, modifying the display of the spatial object based on the manipulation of the first objector the second object.

24. The computer-readable memory as claimed in claim 23, wherein the operations further comprising displaying a software entity that implements the manipulation of the first object or the second object.

25. The computer-readable memory as claimed in claim 23, wherein limiting the manipulation of the first object and the second object comprises at least one of:

limiting the manipulation of first object or the second object such that a distance between the first object and the second object remains greater than or equal to a minimum distance specified by the minimum limit of the spatial relationship;

limiting the manipulation of the first object or the second object such that the distance between the first object and the second object remains less than or equal to a maximum value specified by the maximum limit of the spatial relationship; or repositioning one of the first object or the second object when a different one of the first object or the second object is manipulated beyond the limits of the spatial relationship, wherein the repositioning repositions the first object or the second object to comply with the limits of the spatial relationship.

26. An apparatus, comprising:

means for defining a first object that indicates a spatial relationship between a second object and a third object based on specified limits to a distance or an angle between the second object and the third object, the limits being configurable to include a minimum limit and a maximum limit of the spatial relationship;

means for generating a display of the first object, the second object, and the third object to visually indicate the spatial relationship between the second object and the third object, including using the first object to visually indicate the minimum limit using a margin element of the first object that has a length corresponding to the minimum limit, and to visually indicate that decreasing the spatial relationship beyond the minimum limit and increasing the spatial relationship beyond the maximum limit are prohibited, the first object configured to visually indicate the maximum limit concurrently with the minimum limit responsive to manipulation that attempts to increase the spatial relationship beyond the maximum limit;

means for manipulating at least one of the second object or the third object, the manipulating causing the spatial relationship between the second object and the third object to change; and means for causing the graphical user interface to display, in response to the manipulating, the first object to indicate an effect of the manipulating on the spatial relationship between the second object and the third object.

27. The apparatus as claimed in claim 26, wherein:

the first object is configured to visually indicate that decreasing the spatial relationship beyond the minimum limit is prohibited when the distance between the second object and the third object is equal to the minimum limit of the spatial relationship; and the first object is configured to visually indicate that increasing the spatial relationship beyond the maximum limit is prohibited when the distance between the second object and the third object is equal to the maximum limit of the spatial relationship.

28. An apparatus, comprising:

means for displaying a first object;

means for displaying a second object;

means for defining a spatial object that indicates a spatial relationship between the first object and the second object, the spatial object defined by limits of the spatial relationship that are configurable to include a minimum and a maximum limit of the spatial relationship;

means for displaying the spatial object, the spatial object configured to visually indicate the minimum limit using a margin element of the spatial object that has a length corresponding to the minimum limit, and to visually indicate that decreasing the spatial relationship beyond the minimum limit and increasing the spatial relationship beyond the maximum limit are prohibited, the spatial object configured to visually indicate the maximum limit concurrently with the minimum limit responsive to manipulation that attempts to increase the spatial relationship beyond the maximum limit;

means for modifying the spatial relationship between the first object and the second object in response to a manipulation of the first object or the second object that is limited by the limits of the spatial relationship; and means for updating, in response to the manipulation, the display of the spatial object based on the manipulation of the first object or the second object.

* * * * *